United States Patent
Taftaf et al.

(10) Patent No.: US 9,587,049 B2
(45) Date of Patent: Mar. 7, 2017

(54) CATALYST COMPONENT FOR THE POLYMERIZATION OF OLEFINS

(71) Applicant: SAUDI BASIC INDUSTRIES CORPORATION, Riyadh (SA)

(72) Inventors: Mansour I. Taftaf, Peninsula, OH (US); Nourdin Ghalit, Amstenrade (NL); Gennadii Dimitrievich Bukatov, Geleen (NL); Sergei Andreevich Sergeev, Geleen (NL); Vladimir Aleksandrovich Zakharov, Geleen (NL); Jaiprakash Brijlal Sainani, Bangalore (IN); Aurora Alexandra Batinas-Geurts, Geleen (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/380,473

(22) PCT Filed: Feb. 21, 2013

(86) PCT No.: PCT/EP2013/000506
§ 371 (c)(1),
(2) Date: Aug. 22, 2014

(87) PCT Pub. No.: WO2013/124063
PCT Pub. Date: Aug. 29, 2013

(65) Prior Publication Data
US 2015/0038660 A1    Feb. 5, 2015

(30) Foreign Application Priority Data
Feb. 22, 2012 (EP) ...................... 12001166

(51) Int. Cl.
C08F 110/06    (2006.01)
C08F 10/00    (2006.01)
(52) U.S. Cl.
CPC ............ C08F 110/06 (2013.01); C08F 10/00 (2013.01)
(58) Field of Classification Search
None
See application file for complete search history.

(56) References Cited

U.S. PATENT DOCUMENTS 4,414,132 A    11/1983 Goodall et al.
4,978,648 A    12/1990 Barbe et al.
(Continued)

FOREIGN PATENT DOCUMENTS

EP    1283222 A1    2/2003
EP    2562189 A1    2/2013
(Continued)

OTHER PUBLICATIONS

Correction to Written Opinion for PCT/EP/2013/000506 mailed Jun. 21, 2013, 9 pages.
EP1222214 Abstract Only [see English equivalent WO012344].
EP1838741A1 Abstract Only (See English equivalent, WO2006056338).
Gordillo, Barbara and Hernandez, Javier, "An Alternative Strategy for the Purification of meso-2,4-Pentanediol", Organic Preparations and Procedures Int., 29 (2), 195-199 (1997).
Grindley, T. Bruce and Gulasekharam, V., "Benzylidene Acetal Structural Elucidation by N.M.R. Spectroscopy: Application of Carbon-13 N.M.R.-Spectral Parameters", Carbohydrate Research, 74, 7-30 (1979).
(Continued)

Primary Examiner — Catherine S Branch
(74) Attorney, Agent, or Firm — Cantor Colburn LLP

(57) ABSTRACT

The present invention relates to a catalyst component for polymerization of an olefin comprising a compound represented by the Fischer projection of: wherein $R^5$ is substituted or unsubstituted hydrocarbyl having 1 to 20 carbon atoms; $R^6$ and $R^7$ are different and independently selected from the group consisting of hydrogen, halogen and substituted or unsubstituted hydrocarbyl having 1 to 20 carbon atoms; $R^5$-$R^7$ optionally containing one or more hetero-atoms replacing one or more carbon atoms, one or more hydrogen atom or both, wherein said hetero-atom is selected from the group consisting of nitrogen, oxygen, sulfur, silicon, phosphorus and halogen; and wherein the compound of Formula (I) is the only internal electron donor in the catalyst component. The present invention also relates to a process for preparing a polymerization catalyst component comprising the steps of i) contacting a compound $R^4_z MgX_{2-z}$ wherein $R^4$ is aromatic, aliphatic or cyclo-aliphatic group containing 1 to 20 carbon atoms, X is a halide, and z is in a range of larger than 0 and smaller than 2, with an alkoxy- or aryloxy-containing silane compound to give a first intermediate reaction product; ii) contacting the first intermediate reaction product with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v and iii) contacting the second intermediate reaction product with a halogen-containing Ti-compound and an internal electron donor represented by the Fischer projection of formula (I); and optionally with at least one compound selected from a group comprising a monoester, a diester and a 1,3-diether.

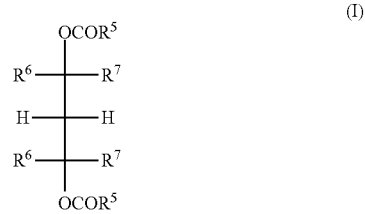

13 Claims, No Drawings

(56) References Cited

U.S. PATENT DOCUMENTS

| | | |
|---|---|---|
| 5,077,357 A | 12/1991 | Job |
| 5,106,806 A | 4/1992 | Job |
| 5,556,820 A | 9/1996 | Funabashi et al. |
| 6,799,568 B2 | 10/2004 | Zakharov et al. |
| 7,388,061 B2 | 6/2008 | Gao et al. |
| 2013/0041120 A1 | 2/2013 | Gao et al. |

FOREIGN PATENT DOCUMENTS

| | | | |
|---|---|---|---|
| NL | GB 1235062 A * | 6/1971 | ............ C08F 10/00 |
| WO | 9632426 A1 | 10/1996 | |
| WO | 9632427 A1 | 10/1996 | |
| WO | 0123441 A1 | 4/2001 | |
| WO | 2006056338 A1 | 6/2006 | |
| WO | 2007134851 A1 | 11/2007 | |
| WO | 2011131033 A1 | 10/2011 | |

OTHER PUBLICATIONS

International Search Report and the Written Opinion of the International Searching Authority for PCT/EP2013/00506 mailed Jun. 6, 2013, 15 pages.

Pirrung, Michael C. and Nunn, David S., "Synthesis of Quinone Monoketals by Diol Exchange", Tetrahedron Letters, 33 (44), 6591-6594 (1992).

Pullukat, Thomas J. and Hoff, Raymond E., "Silica-Based Ziegler—Natta Catalysts: A Patent Review", Catal. Rev.—Sci. Eng., 41(3 &4), 389-428 (1999).

* cited by examiner

CATALYST COMPONENT FOR THE POLYMERIZATION OF OLEFINS

This application is a national stage application of PCT/EP13/000506 filed on Feb. 21, 2013, which claims priority to EP 12001166.3 filed on Feb. 22, 2012, both of which are hereby incorporated by reference in their entirety.

The invention is directed to a catalyst component for the polymerization of an olefin. The invention also relates to a process for preparing said polymerization catalyst component and to a catalyst component directly obtainable by said process. Furthermore, the invention is directed to a polymerization catalyst system comprising said catalyst component and to a process of making a polyolefin by contacting at least one olefin with a polymerization catalyst system comprising said catalyst component. The invention also relates to the use of said catalyst component for the polymerization of an olefin.

Catalyst systems and their components that are suitable for preparing a polyolefin such as for example polypropylene are generally known, and the essential elements for the preparation of such catalyst components include a solid magnesium-containing compound and a titanium compound supported thereon. Such catalysts are generally referred to as Ziegler-Natta catalysts. The 'Ziegler-Natta catalyst' term is well-known in the art and typically refers to catalyst systems comprising a transition metal containing a solid catalyst component (also generally referred to in the prior art as procatalyst or catalyst precursor); an organo-metal component as co-catalyst and, optionally, one or more electron donor components (e.g. external donors). The transition metal containing the solid catalyst component comprises a transition metal halide, i.e. titanium, chromium, vanadium halide supported on a metal or metalloid compound, such as magnesium chloride or silica. An overview of different catalyst types is for example given by T. Pullukat and R. Hoff in Catal. Rev.—Sci. Eng. 41, vol. 3 and 4, 389-438, 1999.

Document U.S. Pat. No. 7,388,061B2 discloses a solid catalyst component for the polymerization of olefins comprising magnesium, titanium, a halogen and an electron donor, wherein said electron donor comprises an ester of polyol, a.o. (2S,4S)-2,4-pentanediol dibenzoate and (2R,4R)-2,4-pentanediol dibenzoate.

Processes for the preparation of such Ziegler-Natta type catalyst components is also described for instance in WO96/32427 A1, which discloses a 3-step process wherein, in the first two steps a Mg-containing support of certain morphology is prepared, and subsequently the Mg-containing support is contacted with titanium tetrachloride, and optionally an electron-donating compound. WO2007/134851 A1 describes an improved catalyst and process of WO96/32427 A1. WO2007/134851 A1 describes a process for preparing a polymerization catalyst component in which a solid magnesium chloroalkoxide, obtained from a Grignard compound and a silane compound, is contacted with a certain activating compound before being contacted with titanium tetrachloride. Examples of the activating compound include internal electron donors such as carboxylic acids, carboxylic acid anhydrides, carboxylic acid esters, alcohols and ethers and titanium tetraalkoxides.

However, the polypropylenes obtained by using these catalyst components have rather narrow molecular weight distribution and low isotacticity. The molecular weight distribution (MWD) influences the properties of polyolefins and as such influences the end-uses of a polymer; broad MWD generally improves the flowability at high shear rate during the processing and the processing of polyolefins in applications requiring fast processing at fairly high die swell, such as in blowing and extrusion techniques. In addition, the xylene solubles, which consist primarily of amorphous (atactic) polymer and oligomers generally increase with broadening the molecular weight distribution, which is not desirable for many applications, for instance in the automotive field and packaging area for food and medicals. Polymers with high stereospecifity are polymers having high isotacticity and thus low amount of atactic polymer fraction. It is already known that the presence of a high atactic fraction in the polymer can deteriorate the properties of the final product, such as decreasing the strength of the materials and also migrating to the material surface causing for instance blooming. Therefore, polymers with broad molecular weight distribution and still high isotacticity, i.e. low atactic polymer content are becoming increasingly important.

It is thus an object of the invention to provide an improved catalyst, which allows preparation of a polyolefin by polymerization, especially of polypropylene, the obtained polyolefin having broad molecular weight distribution and high isotacticity, i.e. having a low amount of atactic isomer.

This object is achieved with a catalyst component that comprises a compound represented by the Fischer projection of Formula (I),

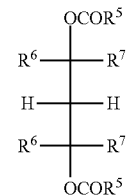

Formula I wherein,
$R^5$ is a substituted or unsubstituted hydrocarbyl having 1 to 20 carbon atoms;
$R^6$ and $R^7$ are different and independently selected from the group consisting of hydrogen, halogen, and substituted or unsubstituted hydrocarbyl having 1 to 20 carbon atoms; and
$R^5$-$R^7$ optionally contain one or more hetero-atoms replacing one or more carbon atoms, one or more hydrogen atoms or both, wherein said hetero-atom is selected from the group consisting of nitrogen, oxygen, sulfur, silicon, phosphorus and halogen; and
wherein the compound of Formula I is the only internal electron donor in the catalyst component.

In an embodiment, the present invention also relates to a catalyst component comprising the compound of Formula I as an internal electron donor, with the proviso that said catalyst component does not comprise a (2S,4S)-isomer, which is the compound having the structure in Formula 1 and/or a (2R,4R)-isomer, which is the compound having the structure in Formula 2, wherein $R^5$-$R^7$ are the same as defined for the compound of Formula I. R and S illustrate the chiral centers of the molecules, as known to the skilled person. The compounds in Formula 1 and 2 may be also referred herein as enantiomers. For instance, the enantiomer of Formula 1 may be (2S,4S)-2,4-pentanediol dibenzoate and the enantiomer of Formula 2 may be (2R,4R)-2,4-pentanediol dibenzoate; and the mixture comprising all these isomers may be 2,4-pentanediol dibenzoate (PDDB).

Formula 1

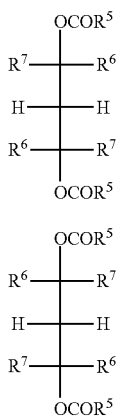

Formula 2

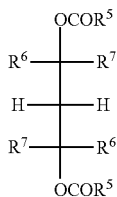

In another embodiment, all internal donors in the catalyst component according to the present invention are represented by the compound of Formula I. The structure of the compound of Formula I can be alternatively illustrated by Formula Ia (2R,4S meso-isomer) and Ib (2S,4R meso-isomer).

Formula 1a

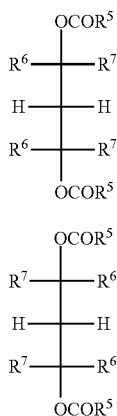

Formula 1b

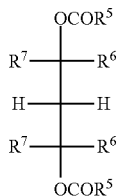

In still another embodiment, the catalyst component according to the present invention comprises an internal electron donor, wherein the internal electron donor comprises a compound represented by the Fischer projection of Formula I but not the compound represented by the Fischer projection of Formula 1 and/or of Formula 2.

The compound of Formula I is a meso-isomer, i.e. it contains two stereocenters (chiral centers) but it is not chiral. It is an advantage of the catalyst comprising a meso-isomer as defined in claim 1 that it allows the preparation of a polyolefin having a relatively high isotacticity and broad molecular weight distribution. This means that the catalyst according to the present invention yields low amounts of amorphous polymer and thus polyolefins having low xylene soluble content.

A further advantage of the catalyst component according to the present invention is the low amount of wax, i.e. formation of low molecular weight polymers formed during the polymerization reaction, which results in reduced or no "stickiness" inside the polymerization reactor. Moreover, the polymers obtained with the catalyst component according to the present invention have high yield.

An internal donor (also referred to as internal electron donor) is herein defined as an electron-donating compound that is commonly described as a reactant in the preparation of a solid catalyst component for a (Ziegler-Natta) catalyst system for olefin polymerization; i.e. contacting a magnesium-containing support with a halogen-containing Ti compound and an internal donor.

As used herein, the term "hydrocarbyl" is a substituent containing hydrogen and carbon atoms, including linear or branched, saturated or unsaturated aliphatic radical, such as alkyl, alkenyl, and alkynyl; alicyclic radical, such as cycloalkyl, cycloalkenyl; aromatic radical, such as monocyclic or polycyclic aromatic radical, as well as combinations thereof, such as alkaryl and aralkyl.

In the present invention, at least one group of $R^6$ and $R^7$ in the Formula I may be selected from the group consisting of hydrogen, halogen, C1-C10 linear or branched alkyl, C3-C10 cycloalkyl, C6-C10 aryl, and C7-C10 alkaryl or aralkyl group.

More preferably, at least one group of $R^6$ and $R^7$ is selected from the group consisting of hydrogen, methyl, ethyl, propyl, isopropyl, butyl, tert-butyl, phenyl, and halophenyl group.

Preferably, either $R^6$ or $R^7$ represents hydrogen. More preferably, $R^6$ and $R^7$ represent a methyl or an ethyl group. Particularly preferred is when either of $R^6$ and $R^7$ represents hydrogen and the other $R^6$ or $R^7$ represents a methyl or an ethyl group.

$R^5$ is preferably selected from benzene-ring containing groups, such as phenyl, phenyl substituted by alkyl, alkoxy or halogen; optionally the carbon atom(s) on the benzene ring being replaced by a hetero-atom of oxygen atom and/or nitrogen atom; alkenyl or phenyl substituted alkenyl, such as vinyl, propenyl, styryl; alkyl, such as methyl, ethyl, propyl, etc.

More preferably, $R^5$ represents a phenyl group.

Particularly preferred as the internal donor according to formula (I) is meso pentane-2,4-diol dibenzoate (mPDDB). A catalyst component having meso pentane-2,4-diol dibenzoate allows preparation of a polyolefin having high isotacticity (i.e. low amount of atactic polymer and low xylene solubles content) and broad molecular weight distribution.

The catalyst component according to the present invention may also further contain a monoester. Said monoester can be any ester of a monocarboxylic acid known in the art. The monoester can have the formula R'—CO—OR" (Formula II), wherein R' can be the same or different from R".

R' and R" may be selected from the group consisting of hydrogen, straight, branched and cyclic alkyl having at most 20 carbon atoms and aromatic substituted and unsubstituted hydrocarbyl having 6 to 20 carbon atoms. Particularly, R' may be selected from the group consisting of hydrogen; straight and branched alkyl having 1 to 20 carbon atoms, preferably 1 to 10 carbon atoms and most preferably 1 to 5 carbon atoms; and cyclic alkyl having 3 to 20 carbon atoms, preferably 3 to 10 carbon atoms and most preferably 3 to 5 carbon atoms; and aromatic substituted and unsubstituted hydrocarbyl having 6 to 20 carbon atoms, preferably 6 to 10 carbon atoms.

Suitable examples of monoesters include formates, for instance, butyl formate; acetates, for instance ethyl acetate, amyl acetate and butyl acetate; acrylates, for instance ethyl acrylate, methyl methacrylate and isobutyl methacrylate; benzoates, particularly C1-C20 hydrocarbyl esters of benzoic acid, wherein the hydrocarbyl group is substituted or unsubstituted with one or more Group 14, 15 or 16 heteroatom containing substituents and C1-C20 (poly)hydrocarbyl ether derivatives thereof, preferably, C1-C4 alkyl benzoate and C1-C4 ring alkylated derivatives thereof; more preferably, methyl benzoate, ethyl benzoate, propyl benzoate, methyl p-methoxy benzoate, methyl p-ethoxy benzoate; most preferably ethyl benzoate. Other suitable examples include methyl-p-toluate and ethyl-naphthate. More preferably, the monoester is an acetate or a benzoate. Most preferably, the monoester is ethyl acetate, amyl acetate or ethyl benzoate.

Most preferably, the monoester is an ester of an aliphatic monocarboxylic acid having C1-C10 carbon atoms.

According to the present invention, the monoester that may be in the catalyst component is not a stereospecificity agent, like internal donors are known to be in the art. This means that the monoester in the composition of the catalyst component is not an internal electron donor. Without to be bound by any theory, the inventors believe that the monoester used in the present invention participates in the formation of the magnesium halogen (e.g. $MgCl_2$) crystallites during the interaction of Mg-containing support with titanium halogen (e.g. $TiCl_4$). The monoester may form intermediate complexes with Ti and Mg halogen compounds (for instance, $TiCl_4$, $TiCl_3(OR)$, $MgCl_2$, $MgCl(OEt)$, etc.), helps to the removal of titanium products from solid particles to mother liquor and affects the activity of final catalyst. Therefore, the monoester in the catalyst component according to the present invention is an activating agent and not an internal electron donor.

The term "catalyst component" may be also referred herein to as "procatalyst" or "solid catalyst component" or "catalyst precursor". The catalyst component according to the present invention can be a solid catalyst component of a Ziegler-Natta type of catalyst system as known in the art and which typically comprises a magnesium-containing support, a halogen-containing titanium compound and the internal electron donor as defined herein. Such catalyst systems are generally described in the prior art, for instance in documents WO96/32426A, WO2006/056338A1, EP1838741B1 and U.S. Pat. No. 5,077,357.

The catalyst component according to the present invention may comprise at least one transitional metal selected from the group consisting of Ti, Zr, Hf, Al and Si and the internal electron donor of Formula I. The catalyst component according to the present invention preferably comprises magnesium, titanium, halogen and an internal electron donor, wherein the internal electron donor in the catalyst component is the compound of Formula I.

In another embodiment, the catalyst component according to the present invention comprises Ti, Mg, a halogen and the compound represented by the Fischer projection of Formula I as an internal electron donor, with the proviso that the catalyst component does not comprise compounds according to Formula 1 and/or 2.

Preferably, the catalyst component according to the present invention comprises magnesium, a halogen, titanium, an internal electron donor and optionally a monoester as an activating agent, wherein the compound represented by the Fischer projection of Formula I is the only internal electron donor in the catalyst component.

The catalyst component according to the present invention may be made by any process known in the art to make a solid Ziegler-Natta catalyst component. The process for preparing the catalyst component according to the present invention comprises contacting a magnesium-containing support with a halogen-containing titanium compound, the internal electron donor according to Formula I and optionally a monoester as activating agent.

The magnesium-containing support and halogen-containing titanium compound that can be used in the process according to the present invention are known and described in the art as typical components of a solid Ziegler-Natta catalyst component, particularly forming the solid component of a Ziegler-Natta catalyst system. Any magnesium-containing support and any halogen-containing titanium compounds known in the art can be used in the process according to the present invention to make the catalyst component according to the present invention. For instance, synthesis of such titanium-magnesium based catalyst compositions with different magnesium-containing support-precursors, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283 222A1, EP1222 214B1; U.S. Pat. No. 5,077,357; U.S. Pat. No. 5,556,820; U.S. Pat. No. 4,414,132; U.S. Pat. No. 5,106,806 and U.S. Pat. No. 5,077,357 but the present process is not limited to the disclosure in these documents.

The present invention also relates to a process for preparing a catalyst component for polymerization of an olefin comprising the steps of:

i) contacting a compound $R^4_2MgX_{2-z}$, wherein $R^4$ is aromatic, aliphatic or cyclo-aliphatic group containing 1 to 20 carbon atoms, X is a halide, and z is in a range of larger than 0 and smaller than 2, with an alkoxy- or aryloxy-containing silane compound to give a first intermediate reaction product;

ii) contacting the first intermediate reaction product with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v and iii) contacting the second intermediate reaction product with a halogen-containing Ti-compound, an internal electron donor represented by the Fischer projection of:

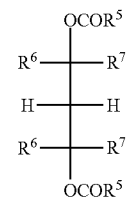

Formula I wherein $R^5$ is substituted or unsubstituted hydrocarbyl having 1 to 20 carbon atoms, $R^6$ and $R^7$ are different and independently selected from the group consisting of hydrogen, halogen and substituted or unsubstituted hydrocarbyl having 1 to 20 carbon atoms, $R^5$-$R^7$ optionally contain one or more hetero-atoms replacing one or more carbon atoms, one or more hydrogen atom or both, wherein said hetero-atom is selected from the group consisting of nitrogen, oxygen, sulfur, silicon, phosphorus and halogen, and optionally with at least one compound selected from a group comprising a monoester, a diester and a 1,3-diether.

In a preferred embodiment, the process for preparing a catalyst component for polymerization of an olefin comprises the steps of:
i) contacting a compound $R^4{}_zMgX_{2-z}$, wherein $R^4$ is aromatic, aliphatic or cyclo-aliphatic group containing 1 to 20 carbon atoms, X is a halide, and z is in a range of larger than 0 and smaller than 2, with an alkoxy- or aryloxy-containing silane compound to give a first intermediate reaction product;
ii) contacting the first intermediate reaction product with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v and
iii) contacting the second intermediate reaction product with a halogen-containing Ti-compound, an internal electron donor represented by the Fischer projection of:

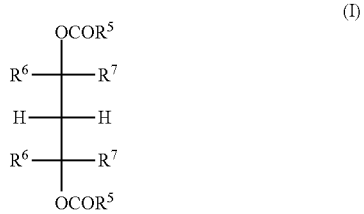

(I)

wherein $R^5$ is substituted or unsubstituted hydrocarbyl having 1 to 20 carbon atoms,
$R^6$ and $R^7$ are different and independently selected from the group consisting of hydrogen, halogen and substituted or unsubstituted hydrocarbyl having 1 to 20 carbon atoms,
$R^5$-$R^7$ optionally contain one or more hetero-atoms replacing one or more carbon atoms, one or more hydrogen atom or both, wherein said hetero-atom is selected from the group consisting of nitrogen, oxygen, sulfur, silicon, phosphorus and halogen,
and optionally with at least one compound selected from a group comprising a monoester, a diester and a 1,3-diether, with the proviso that said catalyst component does not include a compound represented by Formula 1 and/or Formula 2, Formula 1

```
        OCOR5
    R7──┼──R6
    H ──┼── H
    R6──┼──R7
        OCOR5
```

Formula 2

```
        OCOR5
    R6──┼──R7
    H ──┼── H
    R7──┼──R6
        OCOR5
```

The invention further relates to a catalyst component for polymerization of olefins obtainable by or obtained by the process according to the present invention.
Step i)
In step i) of the process according to the invention, a first intermediate reaction product, i.e. a solid magnesium-containing support is prepared by contacting a compound or a mixture of compounds of formula $R^4{}_zMgX_{2-z}$ wherein $R^4$ is aromatic, aliphatic or cyclo-aliphatic group containing 1 to 20 carbon atom, X is a halide, and z is larger than 0 and smaller than 2, with an alkoxy- or aryloxy-containing silane compound, as for example described in WO 96/32427 A1 and WO01/23441 A1. In the compound $R^4{}_zMgX_{2-z}$, also referred to as Grignard compound, X is preferably chlorine or bromine, more preferably chlorine.

$R^4$ can be an alkyl, aryl, aralkyl, alkoxide, phenoxide, etc., or mixtures thereof. Suitable examples of group $R^4$ are methyl, ethyl, n-propyl, i-propyl, n-butyl, i-butyl, t-butyl, hexyl, cyclohexyl, octyl, phenyl, tolyl, xylyl, mesityl and benzyl. In a preferred embodiment of the invention, $R^4$ represents an aromatic group, for instance a phenyl group. The Grignard compound of formula $R^4{}_zMgX_{2-z}$, wherein z is larger than 0 and smaller than 2, is preferably characterized by z being from about 0.5 to 1.5.

The alkoxy- or aryloxy-containing silane used in step i) is preferably a compound or a mixture of compounds with the general formula $Si(OR^{13})_{4-n}R^{14}{}_n$, wherein n can range from 0 up to 4, preferably n is from 0 up to and including 1, and wherein each $R^{13}$ and $R^{14}$ groups, independently, represent an alkyl, alkenyl or aryl group, optionally containing one or more hetero atoms for instance O, N, S or P, with, for instance, 1-20 C-atoms, as defined below for $R^2$ and $R^3$. Examples of suitable silane-compounds include tetramethoxysilane, tetraethoxysilane, methyltrimethoxysilane, methyltributoxysilane, ethyltriethoxysilane, phenyltriethoxysilane, diethyldiphenoxysilane, n-propyltriethoxysilane, diisopropyldimethoxysilane, diisobutyldimethoxysilane, n-propyltrimethoxysilane, cyclohexylmethyldimethoxysilane, dicyclopentyldimethoxysilane, isobutylisopropyldimethoxylsilane, phenyltrimethoxysilane, diphenyldimethoxysilane, trifluoropropylmethyldimethoxysilane, bis(perhydroisoquinolino)dimethoxysilane, dicyclohexyldimethoxysilane, dinorbornyldimethoxysilane, di(n-propyl)dimethoxysilane, di(iso-propyl)dimethoxysilane, di(n-butyl)dimethoxysilane and/or di(iso-butyl)dimethoxysilane. Preferably, tetraethoxysilane is used as silane-compound in preparing the solid Mg-containing compound in the process according to the invention. Preferably, in step i) the silane-compound and the Grignard compound are introduced simultaneously to a mixing device to result in particles of advantageous morphology, especially of the larger particles, as described in WO 01/23441 A1. Here, 'morphology' does not only refer to the shape of the particles of the solid Mg-compound and the catalyst made therefrom, but also to the particle size distribution (also characterized as span), its fines content, powder flowability, and the bulk density of the catalyst particles. Moreover, it is well known that a polyolefin powder produced in polymerization process using a catalyst system based on such catalyst component has a similar morphology as the catalyst component (the so-called "replica effect"; see for instance S. van der Ven, Polypropylene and other Polyolefins, Elsevier 1990, p. 8-10). Accordingly, almost round polymer particles are obtained with a length/diameter ratio (l/D) smaller than 2 and with good powder flowability.

Introduced simultaneously means that the introduction of the Grignard compound and the silane-compound is done in such way that the molar ratio Mg/Si does not substantially vary during the introduction of these compounds to the mixing device, as described in WO 01/23441 A1.

The silane-compound and Grignard compound can be continuously or batch-wise introduced to the mixing device. Preferably, the both compounds are introduced continuously to a mixing device.

The mixing device can have various forms; it can be a mixing device in which the silane-compound is premixed with the Grignard compound, the mixing device can also be a stirred reactor, in which the reaction between the compounds takes place. Preferably, the compounds are premixed before the mixture is introduced to the reactor for step i). In this way a catalyst component is formed with a morphology that leads to polymer particles with the best morphology (high bulk density, narrow particle size distribution, (virtually) no fines, excellent flowability). The Si/Mg molar ratio during step i) may vary within wide limits for instance from 0.2 to 20. Preferably, the Si/Mg molar ratio is from 0.4 to 1.0.

The period of premixing in above indicated reaction step may vary between wide limits, for instance 0.1 to 300 seconds. Preferably premixing is performed during 1 to 50 seconds.

The temperature during the premixing step is not specifically critical, and may for instance range between 0 and 80° C.; preferably the temperature is between 10° C. and 50° C. The reaction between said compounds may, for instance, take place at a temperature between −20° C. and 100° C.; preferably at a temperature of from 0° C. to 80° C.

The first intermediate reaction product obtained from the reaction between the silane compound and the Grignard compound is usually purified by rinsing with an inert solvent, for instance a hydrocarbon solvent with for example 1-20 C-atoms, like pentane, iso-pentane, hexane or heptane. The solid product can be stored and further used as a suspension in said inert solvent. Alternatively, the product may be dried, preferably partly dried, and preferably under mild conditions; e.g. at ambient temperature and pressure.

The first intermediate reaction product obtained by this step i) may comprise a compound of the formula $Mg(OR^1)_xX_{2-x}$, wherein the group $R^1$ generally is an alkyl containing 1-12 carbon atoms, although the present invention is not limited thereby. It is explicitly noted that it is possible that the first intermediate product obtained by this step i) may have a different structure, for example a complex. Such complexes are already known to the skilled person in the art.

In cases where the first intermediate reaction product is represented by $Mg(OR^1)_xX_{2-x}$, the alkyl group may be linear or branched.

Preferably, the $R^1$ group contains 1-8 carbon atoms. More preferably, at least one of the $R^1$-groups represents an ethyl group. In a preferred embodiment, each $R^1$-group represents an ethyl group.

$R^4_zMgX_{2-z}$, used in step i) may be prepared by contacting metallic magnesium with an organic halide $R^4X$, as described in WO 96/32427 A1 and WO01/23441 A1.

All forms of metallic magnesium may be used, but preferably use is made of finely divided metallic magnesium, for example magnesium powder. To obtain a fast reaction it is preferable to heat the magnesium under nitrogen prior to use.

$R^4$ and X have the same meaning as described above.

Combinations of two or more organic halides $R^4X$ can also be used.

The magnesium and the organic halide $R^4X$ can be reacted with each other without the use of a separate dispersant; the organic halide $R^4X$ is then used in excess. The organic halide $R^4X$ and the magnesium can also be brought into contact with one another in the presence of an inert dispersant. Examples of these dispersants are: aliphatic, alicyclic or aromatic dispersants containing from 4 up to 20 carbon atoms.

Preferably, in this step of preparing $R^4_zMgX_{2-z}$, also an ether is added to the reaction mixture. Examples of ethers are: diethyl ether, diisopropyl ether, dibutyl ether, diisobutyl ether, diisoamyl ether, diallyl ether, tetrahydrofuran and anisole. Dibutyl ether and/or diisoamyl ether are preferably used.

Preferably, an excess of chlorobenzene is used as the organic halide $R^4X$. Thus, the chlorobenzene serves as dispersant as well as organic halide $R^4X$.

The organic halide/ether ratio acts upon the activity of the catalyst component. The chlorobenzene/dibutyl ether volume ratio may for example vary between 75:25 and 35:65.

When the chlorobenzene/dibutyl ether ratio decreases, the bulk density of the polyolefin powder prepared with the aid of the catalyst component becomes lower and when the chlorobenzene/dibutyl ether ratio increases, the amount of the dissolved reaction product $R^4_zMgX_{2-z}$, becomes lower. Consequently, the best results are obtained when the chlorobenzene/dibutyl ether volume ratio is between 70:30 and 50:50.

Small amounts of iodine and/or alkyl halides can be added to cause the reaction between the metallic magnesium and the organic halide $R^4X$ to proceed at a higher rate. Examples of alkyl halides are butyl chloride, butyl bromide and 1,2-dibromoethane. When the organic halide $R^4X$ is an alkyl halide, iodine and 1,2-dibromoethane are preferably used.

The reaction temperature for preparing $R^4_zMgX_{2-z}$, normally is between 20 and 150° C.; the reaction time is normally between 0.5 and 20 hours.

After the reaction for preparing $R^4_zMgX_{2-z}$, is completed, the dissolved reaction product may be separated from the solid residual products.

Step ii)

The first intermediate reaction product is contacted in step ii) with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M, being either 3 or 4, and w is smaller than v.

Examples of suitable internal electron donors which may be added in step ii) of the process according to the invention are known to the skilled person, and include carboxylic acids, carboxylic acid anhydrides, carboxylic acid esters, carboxylic acid halides, alcohols, ethers, ketones, amines, amides, nitriles, aldehydes, alkoxides, sulphonamides, thioethers, thioesters and other organic compounds containing one or more hetero atoms, such as nitrogen, oxygen, sulphur and/or phosphorus. Suitable carboxylic acids may be aliphatic or (partly) aromatic.

Examples include formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and/or trimellitic acid.

Anhydrides of the aforementioned carboxylic acids can be mentioned as examples of carboxylic acid anhydrides, such as for example acetic acid anhydride, butyric acid anhydride and methacrylic acid anhydride.

Suitable examples of esters of above-mentioned carboxylic acids are formates, for instance, butyl formate; acetates, for instance ethyl acetate and butyl acetate; acrylates, for instance ethyl acrylate, methyl methacrylate and isobutyl methacrylate; benzoates, for instance methylbenzoate and ethylbenzoate; methyl-p-toluate; ethyl-naphthate and phthalates, for instance monomethyl phthalate, dibutyl phthalate, diisobutyl phthalate, diallyl phthalate and/or diphenyl phthalate.

Examples of suitable carboxylic acid halides are the halides of the carboxylic acids mentioned above, for instance acetyl chloride, acetyl bromide, propionyl chloride, butanoyl chloride, butanoyl iodide, benzoyl bromide, p-toluoyl chloride and/or phthaloyl dichloride. Suitable alcohols are linear or branched aliphatic alcohols with 1-12 C-atoms, or aromatic alcohols. Examples include methanol, ethanol, butanol, isobutanol, hexanol, xylenol and benzyl alcohol. The alcohols may be used alone or in combination.

In a preferred embodiment of the invention the alcohol is ethanol or hexanol.

Examples of suitable ethers are diethyl ether, dibutyl ether, diisoamyl ether, anisole and ethylphenyl ether, 2,2-diisobutyl-1,3-dimethoxypropane, 2,2-dicyclopentyl-1,3-dimethoxypropane, 2-ethyl-2-butyl-1,3-dimethoxypropane, 2-isopropyl-2-isopentyl-1,3-dimethoxypropane and/or 9,9-bis(methoxymethyl) fluorene. Also, cyclic ethers like tetrahydrofuran (THF), or tri-ethers can be used.

Suitable examples of other organic compounds containing a heteroatom include 2,2,6,6-tetramethyl piperidine, 2,6-dimethylpiperidine, pyridine, 2-methylpyridine, 4-methylpyridine, imidazole, benzonitrile, aniline, diethylamine, dibutylamine, dimethylacetamide, thiophenol, 2-methyl thiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and/or diphenylphosphate.

The activating compound may optionally comprise a compound represented by formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v. w can also be 0. The $R^2$ and $R^3$ groups can be a linear, branched or cyclic alkyl or alkenyl group, suitable groups contain from 1 to 20 carbon atoms, preferably 1-12 or 1-8 carbon atoms. The groups may differ independently, or be the same. Preferably, at least one of the $R^2$ groups represents an ethyl group. In preferred embodiments $R^2$ and $R^3$ are ethyl, propyl or butyl; more preferably all groups are ethyl groups. $R^2$ and $R^3$ can also be aromatic hydrocarbon groups, optionally substituted with e.g. alkyl groups, and can contain for example from 6 to 20 carbon atoms. Preferably, when M is Si, then w is 0.

The $R^2$ and $R^3$ groups may optionally contain one or more hetero atoms, such as for instance O, N, S or P.

Preferably, M in said activating compound is Ti or Si. In a preferred embodiment of the invention the value of w is 0, the activating compound being for example a titanium tetraalkoxide containing 4-32 C-atoms. The four alkoxide groups in the compound may be the same or may differ independently. Preferably, at least one of the alkoxy groups in the compound is an ethoxy group. More preferably the compound is a tetraalkoxide, like titanium tetraethoxide. Si-containing compounds suitable as activating compounds are the same as listed above for step i).

Preferably, a Ti-based compound, for example titanium tetraethoxide, is used together with an alcohol, like ethanol or hexanol, or with an ester compound, like ethylacetate, ethylbenzoate or a phthalate ester, or together with an ether, or with pyridine.

If two or more activating compounds are used in the process according to the invention, their order of addition is not critical, but may affect catalyst performance depending on the compounds used. A skilled person may optimize their addition based on some experiments. The compounds can be added together, or sequentially.

In a preferred embodiment of the invention an internal donor compound is first added in step ii) to the compound with formula $M(OR^2)_{v-w}(R^3)_w$ where after the first intermediate reaction product is added. The activating compounds preferably are added slowly, for instance during a period of 0.1-6, preferably during 0.5-4 hours, most preferably during 1-2.5 hours, each.

In the process according to the invention the inert dispersant is preferably a hydrocarbon solvent. The dispersant may be for example an aliphatic or aromatic hydrocarbon with 1-20 C-atoms.

Preferably, the dispersant is an aliphatic hydrocarbon, more preferably pentane, iso-pentane, hexane or heptane, heptane being most preferred. In the process according to the invention the molar ratio of activating compound to the first intermediate reaction product may range between wide limits and is, for instance, between 0.02 and 1.0. Preferably the molar ratio is between 0.05 and 0.5, more preferably between 0.06 and 0.4, or even between 0.07 and 0.2. In the process according to the invention the temperature in step ii) can be in the range from −20° C. to 70° C.; preferably from −10° C. to 50° C., more preferably in the range from −5° C. to 40° C., and most preferably in the range between 0° C. and 30° C. Preferably, at least one of the reaction components is dosed in time, for instance during 0.1 to 6, preferably during 0.5 to 4 hours, more particularly during 1-2.5 hours.

The obtained second intermediate reaction product may be solid and can be further washed, preferably with the solvent also used as inert dispersant; and then stored and further used as a suspension in said inert solvent. Alternatively, the product may be dried, preferably partly dried, preferably slowly and under mild conditions; e.g. at ambient temperature and pressure.

Starting from a solid Mg-containing product of controlled morphology, said morphology is not negatively affected during treatment with the activating compound. The solid second intermediate reaction product obtained is considered to be an adduct of the Mg-containing compound and the at least one activating compound, and is still of controlled morphology. This second intermediate reaction product is subsequently contacted with a halogen-containing titanium compound in step iii), in the presence of or and an internal electron donor compound (I) as described above in one or more steps.

According to a preferred embodiment, the process according to the invention is characterized in that the solid first intermediate reaction product is contacted with an alcohol and a titanium tetraalkoxide in the presence of an inert dispersant to give a solid second intermediate reaction product, which second intermediate reaction product is then contacted in step iii) with titanium tetrachloride in the presence of an internal donor represented by formula (I).

The Ti/Mg molar ratio in the contact between the second intermediate reaction product and halogen-containing titanium compound preferably is between 10 and 100, most preferably, between 10 and 50.

Step iii)

The second intermediate reaction product is contacted in step iii) with a halogen-containing Ti-compound, the internal electron donor represented by Formula (I) and optionally with at least one compound selected from a group consisting of a monoester, a diester and a 1,3-diether. Preferably, the second intermediate reaction product is contacted with a halogen-containing Ti-compound, the internal electron donor represented by the Fischer projection of formula (I) and a monoester as additional activating agent (i.e. additional to the other activating agents which are added in step ii) of the process). Also preferred, the second intermediate reaction product is contacted with a halogen-containing Ti-compound, the internal electron donor represented by the Fischer projection of formula (I), a monoester and compound selected from the group consisting of a 1,3-diether and a diester.

Any 1,3-diether known in the art can be used in the process according to the present invention. Suitable examples include C6-C20 aromatic and C1-C20 aliphatic substituted 1,3-diethers and preferably, C10-C30, preferably C12-C20 polycyclic aromatic hydrocarbons. Preferably, the 1,3-diether is 2,2-diisobutyl-1,3-dimethoxypropane, 2,2-dicyclopentyl-1,3-dimethoxypropane, 2-ethyl-2-butyl-1,3-dimethoxypropane, 2-isopropyl-2-isopentyl-1,3-dimethoxypropane, 1,1-bis(methoxymethyl)-cyclopentadiene, 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)indene; 1,1-bis(methoxymethyl)-2,3-dimethylindene; 1,1-bis(methoxymethyl)-cyclopenthylindene; 9,9-bis(methoxymethyl) fluorene; 9,9-bis(methoxymethyl)-2,3,6,7-tetramethylfluorene; 9,9-bis(methoxymethyl)-2,3-benzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)difluorofluorene; 9,9-bis(methoxymethyl)-1,2,3,4-tetrahydrofluorene; and 9,9-bis(methoxymethyl)-4-tert-butylfluorene are used as an internal electron donor. The 1,3-diether can be selected from the group consisting of 1,3-diethers with fluorenyl ligand without or with substitutents having C1 to C10 carbon atoms.

The diester can be any diester of a C6-C20 aromatic and C1-C20 aliphatic dicarboxylic acid known in the art. Suitable examples of diesters include C6-C20 aromatic or a C1-C20 aliphatic substituted phthalates, e.g. dibutyl phthalate, diisobutyl phthalate, diallyl phthalate and/or diphenyl phthalate; C6-C20 aromatic or a C1-C20 aliphatic substituted succinates; and also C6-C20 aromatic or a C1-C20 aliphatic substituted esters of malonic acid or glutaric acid. Preferably the diester is a C1-C10 aliphatic substituted phthalate, more preferably dibutyl phthalate.

The molar ratio of the internal electron donor of formula (I) relative to the magnesium in step (iii) may vary between wide limits, for instance between 0.05 and 0.75. Preferably this molar ratio is between 0.05 and 0.2, more preferably 0.05 and 0.1. Preferably, meso pentane-2,4-diol dibenzoate is used as the internal electron donor. During contacting the second intermediate reaction product and the halogen-containing titanium compound, an inert dispersant is preferably used. The first intermediate reaction product may be contacted with at least one activating compound selected from the group formed by internal electron donors and compounds of formula $M(OR^2)_{v-w}(R^3)_w$, wherein M can be Ti, Zr, Hf, Al or Si, each $R^2$ and $R^3$, independently, represent an alkyl, alkenyl or aryl group, v is the valency of M and w is smaller than v in the presence of an internal dispersant. Any substance known in the art that is inert to the Mg-containing support particles may be used as inert dispersant. The dispersant preferably is chosen such that virtually all side products formed are dissolved in the dispersant. Suitable dispersants include for example aliphatic and aromatic hydrocarbons and halogenated aromatic solvents with for instance 4-20 C-atoms. Examples include toluene, xylene, benzene, heptane, o-chlorotoluene and chlorobenzene.

The molar ratio between the monoester of Formula (II) and Mg may range from 0.05 to 0.5, preferably from 0.1 to 0.4, and most preferably from 0.15 to 0.25.

The molar ratio between the 1,3-diether which may be added in step iii) and Mg may range from 0.03 to 0.3, preferably from 0.04 to 0.2, and more preferably from 0.05 to 0.1.

The molar ratio between the diester as defined herein which may be added in step iii) and Mg may range from 0.03 to 0.15, preferably from 0.05 to 0.1.

The second intermediate reaction product can be contacted with the halogen-containing Ti-compound, the compound of Formula I and optionally at least one compound selected from the group comprising of a monoester, a 1,3-diether and a diester as defined herein at any time and any stage and by applying any method known to the skilled person in the art.

Preferably, the second intermediate reaction product is contacted at first in step iii) with the halogen-containing Ti-compound to form a first reaction product. Then, the first reaction product is contacted with the monoester to form a second reaction product and then with the internal donor represented by Formula I to form a third reaction product. Optionally, then the 1,3-diether and/or then the diester are added to the third reaction product.

Particularly, in step iii) the second intermediate reaction product may be contacted with the halogen-containing, preferably with titanium tetrachloride and the monoester at a reaction temperature that may be between 80° C. and 130° C., preferably 90 and 120° C. and a reaction time that may be 50 to 150 min, preferably for 90 to 110 min (stage I of reaction). A purification step (such as separation and washing) may be then performed and then a halogen-containing titanium compound may be added to the reaction product of stage I and the reaction may be kept at a temperature of between 80 and 120° C. for preferably 20 to 60 min (stage II of reaction).

Then the internal donor according to Formula I may be added and stage II may be repeated once (stage III of the titanation reaction) or twice (stage IV of the titanation reaction). The 1,3-diether may be added after adding the internal donor of Formula I and preferably, the 1,3-diether is added at stage III or at stage I when the diester is not added or at stage II when the diester is added. The diester is more preferably added in stage III of the titanation reaction. Chlorobenzene may be used as the effective solvent for the removal of titanation products (e.g. $TiCl_n(OEt)_{4-n}$) and their complexes with donors from solid particles to mother liquor.

The reaction temperature during contacting in step iii) the second intermediate reaction product and the halogen-containing titanium compound is preferably between 0° C. and 150° C., more preferably between 50° C. and 150° C., and more preferably between 100° C. and 140° C. Most preferably, the reaction temperature is between 120° C. and 135° C., which range shows a particularly high catalyst activity and a high MFR values. At higher or lower temperatures the activity of a catalyst system prepared from the catalyst component according to the invention becomes lower. The obtained reaction product may be purified, usually with an inert aliphatic or aromatic hydrocarbon or halogenated aromatic compound, to obtain the catalyst component of the invention. If desired the reaction and subsequent purification steps may be repeated one or more times. A final washing is preferably performed with an aliphatic hydrocarbon to result in a suspended or at least partly dried catalyst component, as described above for the other steps.

The invention further relates to a polymerization catalyst component obtainable by the process according to the invention, and to a polymerization catalyst system comprising said catalyst component.

The polymerization catalyst system comprises the catalyst component according to the invention and a co-catalyst. Preferably, the catalyst system also comprises an external electron-donating compound, also referred to as external electron donor, or simply external donor. The main function of this external donor compound is to affect the stereoselectivity of the catalyst system in polymerization of olefins having 3 or more carbon atoms, and is for this reason also called selectivity control agent. Preferably, the co-catalyst is an organometallic compound containing a metal from group 1, 2, 12 or 13 of the Periodic System of the Elements (Handbook of Chemistry and Physics, 70th Edition, CRC Press, 1989-1990), wherein the system further comprises an external electron donor.

The invention further relates to a process of making a polyolefin by contacting an olefin with a polymerization catalyst system comprising the catalyst component according to the invention or comprising the catalyst component obtainable by the process according to the present invention.

Preferably, the polyolefin made by using the catalyst component of the present invention is polypropylene. It is an advantage of the present invention that polypropylene obtained by employing said catalyst has a low amount of atactic isomer.

The preparation of polyolefins takes place by polymerizing one or more olefins simultaneously and/or successively in the presence of a catalyst system comprising the catalyst according to the invention, a co-catalyst and optionally an external donor.

The olefin according to the invention may be selected from mono- and di-olefins containing from 2 to 10 carbon atoms, such as for example ethylene, propylene, butylene, hexene, octene and/or butadiene. According to a preferred embodiment of the invention the olefin is propylene or a mixture of propylene and ethylene, to result in a propylene homopolymer or copolymer. A propylene copolymer is herein meant to include both so-called random copolymers with relatively low comonomer content, e.g. up to 10 mol %, as well as so-called impact copolymers comprising higher comonomer contents, e.g. from 5 to 80 mol %, more typically from 10 to 60 mol %. The impact copolymers are actually blends of different propylene polymers, like a first component of low comonomer content and high crystallinity, and a second component of high comonomer content having low crystallinity or even rubbery properties.

Generally, the co-catalyst is an organometallic compound containing a metal from group 1, 2, 12 or 13 of the Periodic System of the Elements (Handbook of Chemistry and Physics, 70th Edition, CRC Press, 1989-1990). Preferably, the co-catalyst is an organoaluminium compound. The organoaluminium compound may be, for instance, a compound having the formula $AlR^{15}_3$, wherein each $R^{15}$ independently represents an alkyl group with, for instance, 1-10 C-atoms or an aryl group with, for instance, 6-20 C-atoms. Examples of a suitable organoaluminium compound are trimethyl aluminium, triethyl aluminium, triisobutyl aluminium, and/or trioctyl aluminium. Preferably, the co-catalyst is triethyl aluminium.

Examples of suitable external donors include the compounds described above as internal donors that can be used in the preparation of the catalyst system according to the invention. As external donor also organo-silicon compounds can be used. Mixtures of external donors can also be used.

Examples of organo-silicon compounds that are suitable as external donor are compounds or mixtures of compounds of general formula $Si(OR^{16})_{4-n}R^{17}_n$, wherein n can be from 0 up to 4, preferably n is 1 or 2, and each $R^{16}$ and $R^{17}$, independently, represents an alkyl or aryl group, optionally containing one or more hetero atoms for instance O, N, S or P, with, for instance, 1-20 C— atoms, as defined above for $R^2$ and $R^3$. Examples of suitable compounds include the silane-compounds that can be used as activating compound, as described above. Preferably the organo-silicon compound used as external donor is n-propyl trimethoxysilane, cyclohexyl methyldimethoxysilane, dicyclopentyl dimethoxysilane, di(iso-propyl) dimethoxysilane or di(iso-butyl) dimethoxysilane. The molar ratio of the metal of the co-catalyst relative to titanium in the polymerization catalyst system during the polymerization may vary for instance from 5 to 2000. Preferably this ratio is between 50 and 300.

The aluminium/external donor molar ratio in the polymerization catalyst system preferably is between 0.1 and 200; more preferably between 1 and 100.

The polymerization process can be carried out in the gas phase or in the liquid phase (in bulk or slurry). In the case of polymerization in a slurry (liquid phase) a dispersing agent is present. Suitable dispersing agents include for example n-butane, isobutane, n-pentane, isopentane, hexane, heptane, octane, cyclohexane, benzene, toluene, xylene and liquid propylene. The polymerization conditions of the process according to the invention, such as for example the polymerization temperature and time, monomer pressure, avoidance of contamination of catalyst, choice of polymerization medium in slurry processes, the use of further ingredients (like hydrogen) to control polymer molar mass, and other conditions are well known to persons of skill in the art.

The polymerization temperature may vary within wide limits and is, for example for propylene polymerization, between 0° C. and 120° C., preferably between 40° C. and 100° C. The pressure during (propylene) (co)polymerization is for instance between 0.1 and 6 MPa, preferably between 0.5-3 MPa.

The molar mass of the polyolefin obtained during the polymerization can be controlled by adding during the polymerization hydrogen or any other agent known to be suitable for the purpose. The polymerization can be carried out in a continuous mode or batch-wise. Slurry-, bulk-, and gas-phase polymerization processes, multistage processes of each of these types of polymerization processes, or combinations of the different types of polymerization processes in a multistage process are contemplated herein. Preferably the polymerization process is a single stage gas phase process or a multistage, for instance a 2-stage, gas phase process wherein in each stage a gas-phase process is used.

Examples of gas-phase polymerization processes include both stirred bed reactors and fluidized bed reactor systems; such processes are well known in the art. Typical gas phase α-olefin polymerization reactor systems comprise a reactor vessel to which [alpha]-olefin monomer(s) and a catalyst system can be added and which contain an agitated bed of growing polymer particles.

The present invention further relates to the use of the compound represented by Formula I as the only internal electron donor in a catalyst component for the polymerization of an olefin.

In another embodiment, the present invention also relates to the use of a catalyst component comprising the compound represented by the Fischer projection of Formula I as an internal electron donor,

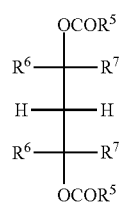

Formula I with the proviso that said catalyst component does not include a compound represented by Formula 1 and/or Formula 2,

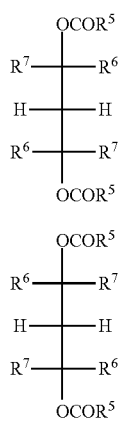

wherein
$R^5$ is substituted or unsubstituted hydrocarbyl having 1 to 20 carbon atoms;
$R^6$ and $R^7$ are different and independently selected from the group consisting of hydrogen, halogen and substituted or unsubstituted hydrocarbyl having 1 to 20 carbon atoms;
$R^5$-$R^7$ optionally contain one or more hetero-atoms replacing one or more carbon atoms, one or more hydrogen atoms or both, wherein said hetero-atom is selected from the group consisting of nitrogen, oxygen, sulfur, silicon, phosphorus and halogen.

It is noted that the invention relates to all possible combinations of features recited in the claims. Features described in the description may further be combined.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will be further elucidated with the following experiments without being limited hereto.

EXAMPLE 1

A. Grignard Formation Step

This step was carried out as described in Example XVI of EP 1 222 214 B1.

A stainless steel reactor of 9 l volume was filled with magnesium powder 360 g. The reactor was brought under nitrogen. The magnesium was heated at 80° C. for 1 hour, after which a mixture of dibutyl ether (1 liter) and chlorobenzene (200 ml) was added. Then iodine (0.5 g) and n-chlorobutane (50 ml) were successively added to the reaction mixture. After the colour of the iodine had disappeared, the temperature was raised to 94° C. Then a mixture of dibutyl ether (1.6 liter) and chlorobenzene (400 ml) was slowly added for 1 hour, and then 4 liter of chlorobenzene was slowly added for 2.0 hours. The temperature of reaction mixture was kept in interval 98-105° C. The reaction mixture was stirred for another 6 hours at 97-102° C. Then the stirring and heating were stopped and the solid material was allowed to settle for 48 hours. By decanting the solution above the precipitate, a solution of phenylmagnesiumchloride reaction product A with a concentration of 1.3 mol Mg/l has been obtained. This solution was used in the further catalyst preparation.

B. Preparation of the First Intermediate Reaction Product

This step was carried out as described in Example XX of EP 1 222 214 B1, except that the dosing temperature of the reactor was 35° C., the dosing time was 360 min and the propeller stirrer was used. 250 ml of dibutyl ether was introduced to a 1 liter reactor. The reactor was fitted by propeller stirrer and two baffles. The reactor was thermostated at 35° C.

The solution of reaction product of step A. (360 ml, 0.468 mol Mg) and 180 ml of a solution of tetraethoxysilane (TES) in dibutyl ether (DBE), (55 ml of TES and 125 ml of DBE), were cooled to 10° C., and then were dosed simultaneously to a mixing device of 0.45 ml volume supplied with a stirrer and jacket. Dosing time was 360 min. Thereafter the premixed reaction product A and the TES-solution were introduced to a reactor. The mixing device (minimixer) was cooled to 10° C. by means of cold water circulating in the minimixer's jacket. The stirring speed in the minimixer was 1000 rpm. The stirring speed in reactor was 350 rpm at the beginning of dosing and was gradually increased up to 600 rpm at the end of dosing stage.

On the dosing completion the reaction mixture was heated up to 60° C. and kept at this temperature for 1 hour. Then the stirring was stopped and the solid substance was allowed to settle. The supernatant was removed by decanting. The solid substance was washed three times using 500 ml of heptane. As a result, a pale yellow solid substance, reaction product B (the solid first intermediate reaction product; the support), was obtained, suspended in 200 ml of heptane. The average particle size of support was 22 μm and span value ($d_{90}$-$d_{10}$)/$d_{50}$=0.5.

C. Preparation of the Second Intermediate Reaction Product

Support activation was carried out as described in Example IV of WO/2007/134851 to obtain the second intermediate reaction product.

In inert nitrogen atmosphere at 20° C. a 250 ml glass flask equipped with a mechanical agitator is filled with slurry of 5 g of reaction product B dispersed in 60 ml of heptane. Subsequently a solution of 0.22 ml ethanol (EtOH/Mg=0.1) in 20 ml heptane is dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour.

The slurry was slowly allowed to warm up to 30° C. for 90 min and kept at that temperature for another 2 hours. Finally the supernatant liquid is decanted from the solid reaction product (the second intermediate reaction product; activated support) which was washed once with 90 ml of heptane at 30° C.

D. Preparation of the Catalyst Component

A reactor was brought under nitrogen and 125 ml of titanium tetrachloride was added to it. The reactor was heated to 100° C. and a suspension, containing about 5.5 g of activated support in 15 ml of heptane, was added to it under stirring. Then the temperature of reaction mixture was increased to 110° C. for 10 min and 0.925 g meso-2,4-pentanediol-dibenzoate (m-PDDB, m-PDDB/Mg=0.075) in 3 ml of chlorobenzene was added to reactor. Then the reaction mixture was kept at 115° C. for 105 min. Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The reaction mixture was kept at 115° C. for 30 min, after which the solid substance was allowed to settle, and the last treatment was repeated once again. The solid substance obtained was washed five times using 150 ml of heptane at 60° C., after which the catalyst component, suspended in heptane, was obtained.

E. Polymerization of Propylene

Polymerization of propylene was carried out in a stainless steel reactor (with a volume of 0.7 l) in heptane (300 ml) at a temperature of 70° C., total pressure 0.7 MPa and hydrogen presence (55 ml) for 1 hour in the presence of a catalyst system comprising the catalyst component according to step D, triethylaluminium and n-propyltrimethoxysilane. The concentration of the catalyst component was 0.033 g/l; the concentration of triethylaluminium was 4.0 mmol/l; the concentration of n-propyltrimethoxysilane was 0.2 mmol/l.

Data on the catalyst performance at the propylene polymerization are presented in Table 1.

EXAMPLE 2

Comparative Experiment

Example 2 was carried out in the same way as Example 1 except the following:
Preparation of the catalyst component was carried out as in step D. of Example 1, but 2R,4R-2,4-pentanediol-dibenzoate was used instead of meso-2,4-pentanediol-dibenzoate.

EXAMPLE 3

Comparative Experiment

Example 3 was carried out in the same way as Example 1 except the following:
Preparation of the catalyst component was carried out as in step D. of Example 1, but 2S,4S-2,4-pentanediol-dibenzoate was used instead of meso-2,4-pentanediol-dibenzoate.

EXAMPLE 4

Comparative Experiment

Example 4 was carried out in the same way as Example 1 except the following:
Preparation of the catalyst component was carried out as in step D. of Example 1, but 2, 4-pentanediol-dibenzoate, prepared as described in U.S. Pat. No. 7,388,061 B2, Ex.5, was used instead of meso-2,4-pentanediol-dibenzoate.

EXAMPLE 4a

Comparative Experiment

Example 4a was carried out in the same way as Example 1 except the following
Preparation of the catalyst component was carried out as in step D Example 1, but 0.82 g of dibutyl phthalate was used instead of meso-2,4-pentadiol-dibenzoate.

EXAMPLE 5

Example 5 was carried out in the same way as Example 1, but step D was carried out as follows. A reactor was brought under nitrogen and 125 ml of titanium tetrachloride was added to it. The reactor was heated to 100° C. and a suspension, containing about 5.5 g of activated support in 15 ml of heptane, was added to it under stirring. Then the temperature of reaction mixture was increased to 110° C. for 10 min, and 0.886 g of ethyl benzoate (EB/Mg=0.15 molar ratio) in 3 ml of chlorobenzene was added to reactor. The reaction mixture was kept at 115° C. for 60 min (stage I of catalyst preparation). Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The reaction mixture was kept at 115° C. for 30 min (stage II of catalyst preparation). After which the stirring was stopped and the solid substance was allowed to settle. The supernatant was removed by decanting, after which a mixture of titanium tetrachloride (62.5 ml) and chlorobenzene (62.5 ml) was added. Then 0.308 g meso-2,4-pentanediol-dibenzoate (m-PDDB, m-PDDB/Mg=0.025 molar ratio) in 3 ml of chlorobenzene was added to reactor. The reaction mixture was kept at 115° C. for 30 min (stage III of catalyst preparation), after which the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min (stage IV of catalyst preparation). After which the stirring was stopped and the solid substance was allowed to settle. The supernatant was removed by decanting and the solid was washed five times using 150 ml of heptane at 60° C., after which the catalyst component, suspended in heptane, was obtained.

EXAMPLE 6

Comparative Experiment

Example 6 was carried out in the same way as Example 5, but in step D 2R,4R-2,4-pentanediol-dibenzoate was used instead of meso-2,4-pentanediol-dibenzoate.

EXAMPLE 7

Comparative Experiment

Example 7 was carried out in the same way as Example 5, but in step D 2S,4S-2,4-pentanediol-dibenzoate was used instead of meso-2,4-pentanediol-dibenzoate.

EXAMPLE 8

Comparative Experiment

Example 8 was carried out in the same way as Example 5, but in step D 2,4-pentanediol-dibenzoate, prepared as described in U.S. Pat. No. 7,388,061 B2, Ex.5, was used instead of meso-2,4-pentanediol-dibenzoate.

EXAMPLE 9

Example 9 was carried out in the same way as Example 5, but in step E no n-propyltrimethoxysilane was used.

EXAMPLE 10

Example 10 was carried out in the same way as Example 8, but in step E no n-propyltrimethoxysilane was used.

TABLE 1

| Example No. | Molar ratio EB/Mg | PDDB isomer | Molar ratio PDDB isomer/Mg | PP yield, kg/g cat | APP[1], wt. % | XS, wt. % | MFR, g/10 min | Mw/Mn |
|---|---|---|---|---|---|---|---|---|
| 1 | 0 | meso | 0.075 | 7.1 | 4.4 | 10.6 | 6.3 | 6.7 |
| 2 | " | 2R, 4R | " | 5.7 | 9.6 | 14.0 | 15.2 | 4.3 |
| 3 | " | 2S, 4S | " | 3.4 | 11.9 | 14.8 | 12.5 | 4.9 |
| 4 | " | PDDB[2] | " | 9.1 | 7.7 | 13.5 | 10.0 | 5.8 |
| 4a | " | DBP | " | 11.5 | 3.3 | 9.2 | 18.6 | 4.5 |
| 5 | 0.15 | meso | 0.025 | 15.4 | 0.8 | 3.8 | 8.0 | 5.7 |
| 6 | " | 2R, 4R | " | 5.5 | 5.2 | 9.7 | 15.7 | 5.8 |
| 7 | " | 2S, 4S | " | 5.0 | 8.4 | 13.3 | 22.6 | 5.1 |
| 8 | " | PDDB[2] | " | 9.9 | 1.3 | 7.3 | 8.4 | 5.3 |
| 9[3] | " | meso | " | 17.9 | 2.1 | 7.4 | 19.9 | 6.4 |
| 10[3] | " | PDDB[2] | " | 12.6 | 11.8 | 16.4 | 35.5 | 5.4 |

[1] Atactic PP is the PP fraction soluble in heptane during polymerization
[2] It is prepared according to U.S. Pat. No. 7,388,061 B2, Ex. 5
[3] In examples No. 9 and 10 the polymerization was carried out without an external donor.

From Table 1 can be seen that the weight percentage of atactic polypropylene is low and the molecular weight distribution (Mw/Mn) is broad when meso-PDDB isomer is used as the internal donor in the process compared to the cases where other isomers (2R,4R and 2S,4S) or mixtures of isomers are used. Also, the PP yield is higher and the APP and XS are lower whereas the MWD is still rather broad.

EXAMPLE 11

Example 11 was carried out in the same way as Example 5, but in step D 0.866 g of ethyl acetate (EA/Mg=0.25 molar ratio) at 90° C. were used instead of 0.886 g of ethyl benzoate (EB/Mg=0.15) at 115° C., respectively.

EXAMPLE 11a

Example 11a was carried out in the same way as Example 11, but in step E no n-propyltrimethoxysilane was used.

EXAMPLE 12

Example 12 was carried out in the same way as Example 11, but in step D m-PDDB/Mg=0.04 molar ratio was used instead of m-PDDB/Mg=0.025.

EXAMPLE 12a

Example 12a was carried out in the same way as Example 12, but in step E no n-propyltrimethoxysilane was used.

EXAMPLE 13

A. Grignard Formation Step

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butylmagnesiumchloride (reaction product of step A) with a concentration of 1.0 mol Mg/l was obtained.

B. Preparation of the First Intermediate Reaction Product

This step was carried out as step B described in Example 1, except that the solution of reaction product of above step A (360 ml, 0.36 mol Mg) and 180 ml of a solution of tetraethoxysilane (TES) in dibutyl ether (38 ml of TES and 142 ml of DBE), were used.

As a result, a white solid reaction product of step B (the first intermediate reaction product; the support), was obtained, suspended in 200 ml of heptane. The average particle size of support was 20 μm and span value $(d_{90}-d_{10})/d_{50}=0.65$.

C. Preparation of the Second Intermediate Reaction Product

In inert nitrogen atmosphere at 20° C. a 250 ml glass flask equipped with a mechanical agitator is filled with slurry of 5 g of the first intermediate reaction product (see above step B) dispersed in 60 ml of heptane. Subsequently a solution of 0.86 ml methanol (MeOH/Mg=0.5 mol) in 20 ml heptane is dosed under stirring during 1 hour. After keeping the reaction mixture at 20° C. for 30 minutes the slurry was slowly allowed to warm up to 30° C. for 30 min and kept at that temperature for another 2 hours. Finally the supernatant liquid is decanted from the solid reaction product (the second intermediate reaction product; activated support) which was washed once with 90 ml of heptane at 30° C.

D. Preparation of the Catalyst Component

This step was carried out as step D described in Example 12, except that 5.3 g of the above activated support and 0.937 g of ethyl acetate (EA/Mg=0.25 molar ratio) were used.

E. Polymerization of Propylene

This step was carried out as step E described in Example 1.

EXAMPLE 13a

Example 13a was carried out in the same way as Example 13, but in step E no n-propyltrimethoxysilane was used.

EXAMPLE 14

Example 14 was carried out in the same way as Example 11, but the preparation of the catalyst component in step D was performed as follows.

A reactor was brought under nitrogen and 62.5 ml of titanium tetrachloride was added to it. The reactor was heated to 90° C. and a suspension, containing about 5.5 g of activated support in 15 ml of heptane, was added to it under stirring. Then the reaction mixture was kept at 90° C. for 10 min, and 0.866 g of ethyl acetate (EA/Mg=0.25 molar ratio) in 3 ml of chlorobenzene was added to reactor. The reaction mixture was kept at 90° C. for 10 min, and 62.5 ml of chlorobenzene was added to reactor. The reaction mixture was kept at 90° C. for 30 min, and 0.616 g meso-2,4-pentanediol-dibenzoate (m-PDDB, m-PDDB/Mg=0.05 molar ratio) in 3 ml of chlorobenzene was added to reactor. Temperature of reaction mixture was increased to 115° C. and the reaction mixture was kept at 115° C. for 60 min (stage I of catalyst preparation). Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The reaction mixture was kept at 115° C. for 30 min (stage II of catalyst preparation), after which the solid substance was allowed to settle. The supernatant was removed by decanting, and the last treatment was repeated once again (stage III of catalyst preparation). The solid substance obtained was washed five times using 150 ml of heptane at 60° C., after which the catalyst component, suspended in heptane, was obtained.

EXAMPLE 14a

Example 14a was carried out in the same way as Example 14, but in step E no n-propyltrimethoxysilane was used.

EXAMPLE 15

Example 15 was carried out in the same way as Example 14, but in step D 5.3 g of the activated support, prepared at step C of Example 13, and 0.937 g of ethyl acetate (EA/Mg=0.25 molar ratio) were used.

EXAMPLE 15a

Example 15a was carried out in the same way as Example 15, but in step E no n-propyltrimethoxysilane was used.

EXAMPLE 16

Example 16 was carried out in the same way as Example 5, but in step D m-PDDB/Mg=0.05 molar ratio was used instead of m-PDDB/Mg=0.025.

EXAMPLE 16a

Example 16a was carried out in the same way as Example 16, but in step E no n-propyltrimethoxysilane was used.

EXAMPLE 17

Example 17 was carried out in the same way as Example 14, but in step D 0.886 g of ethyl benzoate (EB/Mg=0.15) at 115° C. was used instead of EA/Mg=0.25 at 90° C.

EXAMPLE 17a

Example 17a was carried out in the same way as Example 17, but in step E no n-propyltrimethoxysilane was used.

EXAMPLE 18

Example 18 was carried out in the same way as Example 11, but in step D m-PDDB/Mg=0.025 was added at stage II instead of stage III, and 0.545 g of di-n-butylphthalate (DBP/Mg=0.05) was added at stage III.

EXAMPLE 18a

Example 18a was carried out in the same way as Example 18, but in step E no n-propyltrimethoxysilane was used.

EXAMPLE 19

Example 19 was carried out in the same way as Example 5, but in step D m-PDDB/Mg=0.016 molar ratio was used at stage II instead of m-PDDB/Mg=0.025 at stage III, and 1.09 g of di-n-butylphthalate (DBP/Mg=0.1) was added at stage III.

EXAMPLE 19a

Example 19a was carried out in the same way as Example 19, but in step E no n-propyltrimethoxysilane was used.

EXAMPLE 20

Example 20 was carried out in the same way as Example 19, but in step D m-PDDB/Mg=0.011 molar ratio was used instead of m-PDDB/Mg=0.016.

EXAMPLE 20a

Example 20a was carried out in the same way as Example 20, but in step E no n-propyltrimethoxysilane was used.

EXAMPLE 21

Example 21 was carried out in the same way as Example 18, but in step D 0.5 g of 9,9-bis-methoxymethyl-fluorene (flu) (flu/Mg=0.05 molar ratio) was used instead of DBP/Mg=0.05 molar ratio.

EXAMPLE 21a

Example 21a was carried out in the same way as Example 21, but in step E no n-propyltrimethoxysilane was used.

TABLE 2

| Ex. No. | mPDDB/Mg | ME/Mg | mPDDB, wt. % | Ti, wt. % | PP yield, kg/g cat. | APP, wt. % | XS, % | MFR, dg/min | Mw/Mn |
|---|---|---|---|---|---|---|---|---|---|
| 11 | 0.025 | 0.25 (EA) | 9.9 | 3.3 | 18.3 | 0.5 | 3.8 | 5.2 | 5.6 |
| 11a | " | 0.25 (EA) | " | " | 22.0 | 1.1 | 6.4 | 11.3 | |
| 12 | 0.04 | 0.25 (EA) | 12.7 | 3.0 | 17.3 | 0.46 | 2.4 | 3.7 | 5.5 |
| 12a | " | 0.25 (EA) | " | " | 22.8 | 1.0 | 4.9 | 11.1 | |
| 13 | 0.04 | 0.25 (EA) | 12.0 | 3.2 | 10.7 | 0.55 | 4.4 | 4.4 | 5.5 |
| 13a | " | 0.25 (EA) | " | " | 16.1 | 1.3 | 5.6 | 10.4 | |
| 14 | 0.05 | 0.25 (EA) | 7.5 | 2.9 | 15.6 | 0.42 | 4.1 | 6.5 | 5.8 |
| 14a | " | 0.25 (EA) | " | " | 20.7 | 1.2 | 6.6 | 13.9 | |
| 15 | 0.05 | 0.25 (EA) | 7.4 | 3.2 | 12.0 | 0.65 | 7.4 | 7.4 | 5.6 |
| 15a | " | 0.25 (EA) | " | " | 18.3 | 2.0 | 8.0 | 15.3 | |
| 16 | 0.05 | 0.15 (EB) | 8.9 | 2.4 | 14.5 | 0.5 | 3.4 | 5.1 | 5.5 |
| 16a | " | 0.15 (EB) | " | " | 17.3 | 1.1 | 6.0 | 11.5 | 6.0 |
| 17 | 0.05 | 0.15 (EB) | 8.7 | 2.9 | 14.0 | 0.6 | 4.0 | 7.2 | 5.5 |
| 17a | " | 0.15 (EB) | " | " | 19.3 | 2.0 | 8.1 | 17.6 | 6.4 |

TABLE 3

| Ex. No. | mPDDB/Mg (stage II) | 1,3-diether/Mg (stage III) | ME/Mg (stage I) | mPDDB wt. % | 1,3-diether wt. % | Ti wt. % | PP yield kg/g cat. | APP, wt. % | XS % | MFR dg/min | Mw/Mn |
|---|---|---|---|---|---|---|---|---|---|---|---|
| 18 | 0.025 | 0.05 (DBP) | 0.25 (EA) | 7.0 | 5.0 | 2.6 | 16.8 | 0.6 | 3.0 | 8.1 | 6.6 |
| 18a | " | 0.05 (DBP) | 0.25 (EA) | " | " | " | 17.9 | 1.2 | 5.5 | 11.8 | 6.7 |
| 19 | 0.016 | 0.1 (DBP) | 0.15 (EB) | 4.4 | 10.0 | 2.6 | 13.0 | 0.4 | 2.7 | 9.4 | 5.9 |
| 19a | " | 0.1 (DBP) | 0.15 (EB) | " | " | " | 15.2 | 2.5 | 7.7 | 25.3 | 5.7 |
| 20 | 0.011 | 0.1 (DBP) | 0.15 (EB) | 3.3 | 9.1 | 2.4 | 12.0 | 0.6 | 3.2 | 12.4 | 5.9 |
| 20a | " | 0.1 (DBP) | 0.15 (EB) | " | " | " | 9.9 | 4.0 | 12.3 | 33.7 | 5.5 |
| 21 | 0.025 | 0.05 (flu) | 0.25 (EA) | 7.3 | 8.0 | 2.5 | 16.7 | 0.44 | 1.8 | 4.2 | 6.0 |
| 21a | " | 0.05 (flu) | 0.25 (EA) | " | " | " | 18.0 | 0.58 | 2.7 | 6.0 | 5.8 | mPDDB = meso-isomer of the PDDB compound;
ME = monoester

Abbreviations and Measuring Methods:

PP yield, kg/g cat is the amount of polypropylene obtained per gram of catalyst component.

APP, wt % is the weight percentage of atactic polypropylene. Atactic PP is the PP fraction soluble in heptane during polymerization APP was determined as follows: 100 ml of the filtrate (y ml) obtained in separating the polypropylene powder (x g) and the heptane was dried over a steam bath and then under vacuum at 60° C. That yielded z g of Atactic PP. The total amount of Atactic PP (q g) is: (y/100)*z. The weight percentage of Atactic PP is: (q/(q+x))*100%.

XS, wt % is xylene solubles, measured according to ASTM D 5492-10.

MFR is the melt flow rate as measured at 230° C. with 2.16 kg load, measured according to ISO 1133.

Mw/Mn: Polymer molecular weight and its distribution (MWD) were determined by Waters 150° C. gel permeation chromatograph combined with a Viscotek 100 differential viscosimeter. The chromatograms were run at 140° C. using 1,2,4-trichlorobenzene as the solvent with a flow rate of 1 ml/min. The refractive index detector was used to collect the signal for molecular weights.

The invention claimed is:

1. A catalyst component for the polymerization of an olefin comprising:

a compound represented by the Fischer projection of Formula I as an internal electron donor,

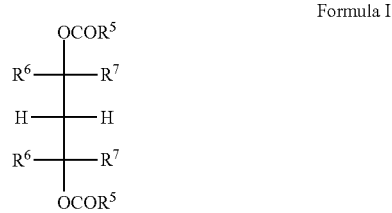

Formula I with the proviso that said catalyst component does not include a compound represented by Formula 1 and/or Formula 2,

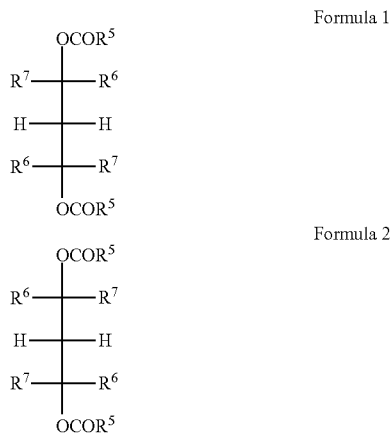

Formula 1

Formula 2 wherein $R^5$ is substituted or unsubstituted hydrocarbyl having 1 to 20 carbon atoms;

$R^6$ and $R^7$ are different and independently selected from the group consisting of hydrogen, halogen and substituted or unsubstituted hydrocarbyl having 1 to 20 carbon atoms;

$R^5$-$R^7$ optionally contain one or more hetero-atoms replacing one or more carbon atoms, one or more hydrogen atoms or both, wherein said hetero-atom is selected from the group consisting of nitrogen, oxygen, sulfur, silicon, phosphorus and halogen, and a monoester as an activating agent.

2. The catalyst component according to claim 1, wherein either $R^6$ or $R^7$ represent hydrogen.

3. The catalyst component according to claim 1, wherein either $R^6$ or $R^7$ represents a methyl or an ethyl group.

4. The catalyst component according to claim 1, wherein either of $R^6$ or $R^7$ represents hydrogen and the other $R^6$ or $R^7$ represents a methyl or an ethyl group.

5. The catalyst component according to claim 1, wherein $R^5$ represents a phenyl group.

6. The catalyst component according to claim 1, wherein the internal electron donor of Formula I is meso pentane-2,4-diol dibenzoate.

7. The catalyst component according to claim 1, wherein the monoester is an ester of an aliphatic monocarboxylic acid having C1-C10 carbon atoms.

8. A process for preparing a catalyst component for the polymerization of an olefin, comprising the steps of:

i) contacting a compound $R^4_z MgX_{2-z}$ wherein $R^4$ is aromatic, aliphatic or cycloaliphatic group containing 1 to 20 carbon atoms, X is a halide, and z is in the range of larger than 0 and smaller than 2, with an alkoxy- or aryloxy-containing silane compound to give a first intermediate reaction product;

ii) contacting the first intermediate reaction product with at least one activating compound selected from the group formed by internal electron donors and compounds of formula $M(OR^2)_{v-w}(R^3)_w$, wherein M is Ti, Zr, Hf, Al or Si, each $R^2$ and $R^3$, independently, represents an alkyl, alkenyl or aryl group, v is the valency of M and w is smaller than v to give a second intermediate reaction product; and iii) contacting the second intermediate reaction product with a halogen-containing Ti-compound and an internal electron donor represented by the Fischer projection of Formula I,

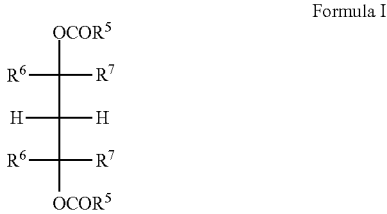

Formula I wherein $R^5$ is substituted or unsubstituted hydrocarbyl having 1 to 20 carbon atoms;

$R^6$ and $R^7$ are different and are selected from the group consisting of hydrogen, halogen and substituted or unsubstituted hydrocarbyl having 1 to 20 carbon atoms;

$R^5$-$R^7$ optionally contain one or more hetero-atoms replacing one or more carbon atoms, one or more hydrogen atom or both, wherein said hetero-atom is selected from the group consisting of nitrogen, oxygen, sulfur, silicon, phosphorus and halogen;
and a monoester activating agent.

9. The process according to claim 8, wherein at least one of the $R^2$ groups represents an ethyl group.

10. The process according to claim 8, wherein the monoester is an ester of an aliphatic monocarboxylic acid having C1-C10 carbon atoms.

11. A catalyst component obtained by the process of claim 8.

12. A polymerization catalyst system comprising the catalyst component according to claim 1, a co-catalyst and optionally an external electron donor.

13. A process of making a polyolefin, comprising contacting at least one olefin with the polymerization catalyst system according claim 12.

* * * * *